United States Patent
Thommen et al.

(10) Patent No.: US 12,351,307 B2
(45) Date of Patent: *Jul. 8, 2025

(54) SHORTENING WINGSPAN OF AN AIRCRAFT

(71) Applicant: The Boeing Company, Arlington, VA (US)

(72) Inventors: Monica Thommen, Woodinville, WA (US); Mark Steven Good, Seattle, WA (US)

(73) Assignee: The Boeing Company, Arlington, VA (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/191,761

(22) Filed: Mar. 28, 2023

(65) Prior Publication Data
US 2024/0326978 A1 Oct. 3, 2024

(51) Int. Cl.
*B64C 3/56* (2006.01)

(52) U.S. Cl.
CPC ..................... *B64C 3/56* (2013.01)

(58) Field of Classification Search
CPC .......... B64C 3/56; B64C 3/546; B64C 23/072
See application file for complete search history.

(56) References Cited

U.S. PATENT DOCUMENTS

| | | |
|---|---|---|
| 1,928,523 A | 9/1933 | Bally |
| 2,402,733 A | 6/1946 | Cooley |
| 3,138,354 A * | 6/1964 | Baetke .................. B64C 3/40 244/90 R |
| 3,421,718 A | 1/1969 | Gehringer et al. |
| 8,157,206 B2 * | 4/2012 | Gionta .................. B64C 3/56 244/49 |
| 8,708,286 B2 | 4/2014 | Sakurai et al. |
| 9,889,920 B2 | 2/2018 | Harding et al. |
| 9,950,780 B2 * | 4/2018 | Santini .................. B64C 3/56 |
| 10,583,909 B2 * | 3/2020 | Alexander ............. B64C 3/56 |
| 11,492,102 B2 * | 11/2022 | Xi ....................... B64C 23/072 |
| 11,780,554 B2 | 10/2023 | Everaert et al. |
| 2013/0056579 A1 | 3/2013 | Schlipf et al. |

(Continued)

FOREIGN PATENT DOCUMENTS

| | | | |
|---|---|---|---|
| CN | 108688793 A | * 10/2018 | ............ B64C 3/56 |
| CN | 115009507 A | 9/2022 | |
| CN | 113665790 B | 3/2023 | |

OTHER PUBLICATIONS

United States Patent and Trademark Office, Office Action Issued in U.S. Appl. No. 18/073,414, filed Apr. 10, 2024, 16 pages.

(Continued)

*Primary Examiner* — Richard Green
(74) *Attorney, Agent, or Firm* — Alleman Hall & Tuttle LLP

(57) ABSTRACT

According to one aspect of the present disclosure, an apparatus for shortening a wingspan of an aircraft is disclosed. The apparatus comprises a first link extending from a wingtip of the aircraft and moveably coupled to a fixed wing of the aircraft. A second link also extends from the wingtip and is moveably coupled to the fixed wing. An actuator is coupled to the fixed wing and to the second link. The actuator is configured to move the second link and cause the wingtip to move between an extended position and a stowed position.

20 Claims, 16 Drawing Sheets

(56) References Cited

U.S. PATENT DOCUMENTS

| | | |
|---|---|---|
| 2016/0167092 A1 | 6/2016 | Gaw |
| 2016/0251075 A1 | 9/2016 | Thompson et al. |
| 2017/0137110 A1 | 5/2017 | Harding et al. |
| 2017/0137111 A1 | 5/2017 | Harding et al. |
| 2019/0337605 A1 | 11/2019 | Lorenz |
| 2020/0079491 A1 | 3/2020 | Gruner et al. |
| 2023/0129220 A1 | 4/2023 | Edwards |

OTHER PUBLICATIONS

United States Patent and Trademark Office, Office Action Issued in U.S. Appl. No. 18/073,403, filed Apr. 4, 2024, 19 pages.

* cited by examiner

400 ⬅

```
┌─────────────────────────────────────────────────────────────────────┐
│       Providing an apparatus for moving a wingtip at least partially behind a │
│  fixed wing of the aircraft, the apparatus comprising: a first link extending from a │
│    wingtip of the aircraft and moveably coupled to a fixed wing of the aircraft; a │
│      second link extending from the wingtip and moveably coupled to the fixed │
│        wing; and an actuator coupled to the fixed wing, the actuator comprising a │
│                     piston coupled to the second link 402          │
└─────────────────────────────────────────────────────────────────────┘
                                    │
                                    ▼
┌─────────────────────────────────────────────────────────────────────┐
│         Positioning the wingtip at an outboard end of the fixed wing 406 │
└─────────────────────────────────────────────────────────────────────┘
                                    │
                                    ▼
┌─────────────────────────────────────────────────────────────────────┐
│   Extending the piston to move the second link and cause the wingtip to │
│            move at least partially behind the fixed wing 410        │
└─────────────────────────────────────────────────────────────────────┘
```

SHORTENING WINGSPAN OF AN AIRCRAFT

FIELD

The present disclosure relates generally to the field of aircraft, and more specifically to shortening the wingspan of an aircraft by moving a wingtip between an extended position and a stowed position.

BACKGROUND

In some examples, the wingspan of an aircraft can inhibit the free movement of the aircraft, such as preventing the aircraft from entering a hangar having a limited-width entryway. To address this issue, some aircraft utilize upwardly-folding wingtips that can temporarily reduce the aircraft's wingspan. As described in more detail below, the configurations described herein provide improved apparatuses for shortening an aircraft's wingspan.

SUMMARY

According to one aspect of the present disclosure, an apparatus for shortening a wingspan of an aircraft is disclosed. The apparatus includes a first link extending from a wingtip of the aircraft and moveably coupled to a fixed wing of the aircraft. A second link extends from the wingtip and is moveably coupled to the fixed wing. An actuator is coupled to the fixed wing and to the second link. The actuator is configured to move the second link and cause the wingtip to move between an extended position and a stowed position.

In another aspect, an aircraft comprises a fixed wing extending from a fuselage, a wingtip moveably coupled to an outboard end of the fixed wing, and an apparatus configured to move the wingtip at least partially behind the fixed wing.

The apparatus comprises a first link extending from a wingtip of the aircraft and moveably coupled to a fixed wing of the aircraft. A second link extends from the wingtip and is moveably coupled to the fixed wing. An actuator is coupled to the fixed wing and to the second link. The actuator is configured to move the second link and cause the wingtip to move between an extended position and a stowed position.

In another aspect, a method of shortening a wingspan of an aircraft is provided. The method comprises providing an apparatus configured to move a wingtip at least partially behind a fixed wing of the aircraft. The apparatus comprises a first link extending from a wingtip of the aircraft and moveably coupled to a fixed wing of the aircraft. A second link extends from the wingtip and is moveably coupled to the fixed wing. An actuator is coupled to the fixed wing and to the second link. The actuator is configured to move the second link and cause the wingtip to move between an extended position and a stowed position.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 20 is a flowchart of an exemplary embodiment of a method of shortening a wingspan of an aircraft.

DETAILED DESCRIPTION

As noted above, in some examples the wingspan of an aircraft can inhibit its free movement into areas having dimensional restrictions. The configurations described herein provide improved apparatus for selectively shortening an aircraft's wingspan by moving a wingtip between an extended position and a stowed position. As described in more detail below, configurations of the present disclosure include components for safely moving and temporarily storing a wingtip at least partially behind a fixed wing, as well as securing the wingtip in an extended position for flight.

Figure 1:
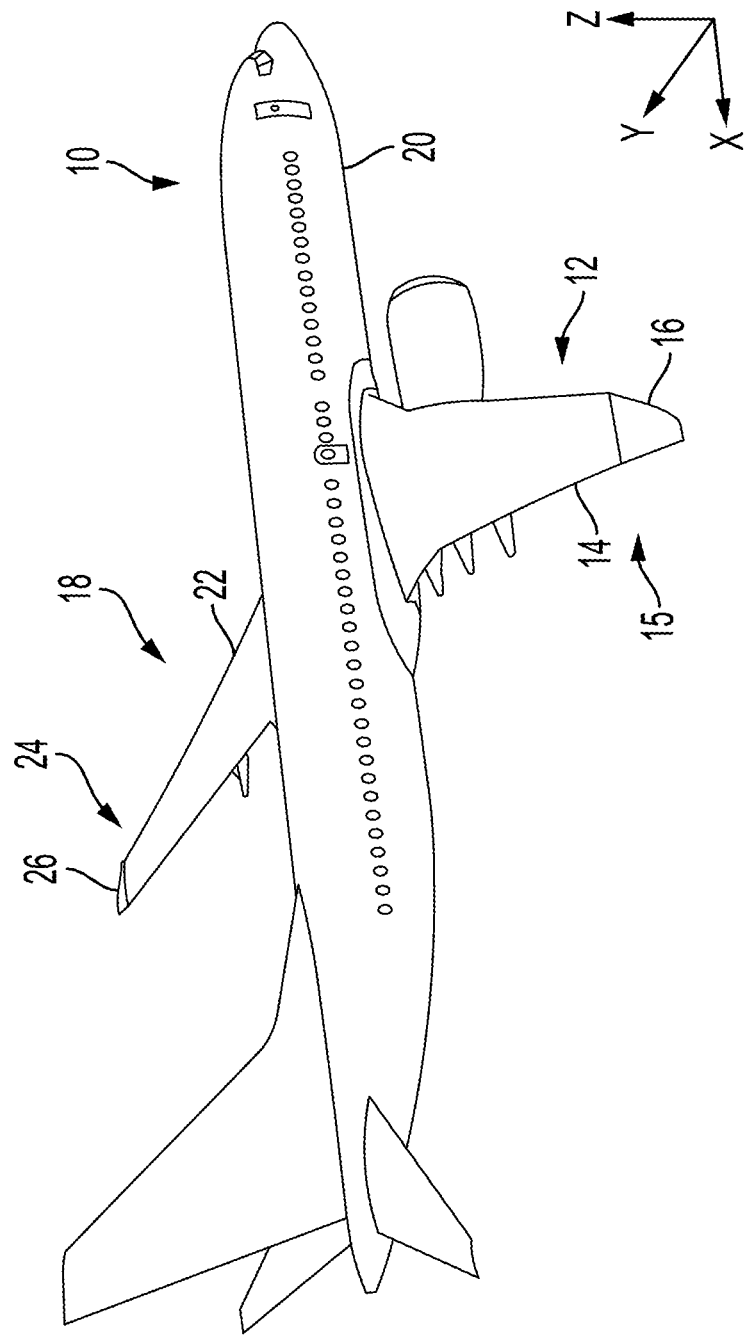
FIG. 1 is a representation of an exemplary embodiment of an aircraft configured to move its wingtips at least partially behind fixed wings.
Figure 2:
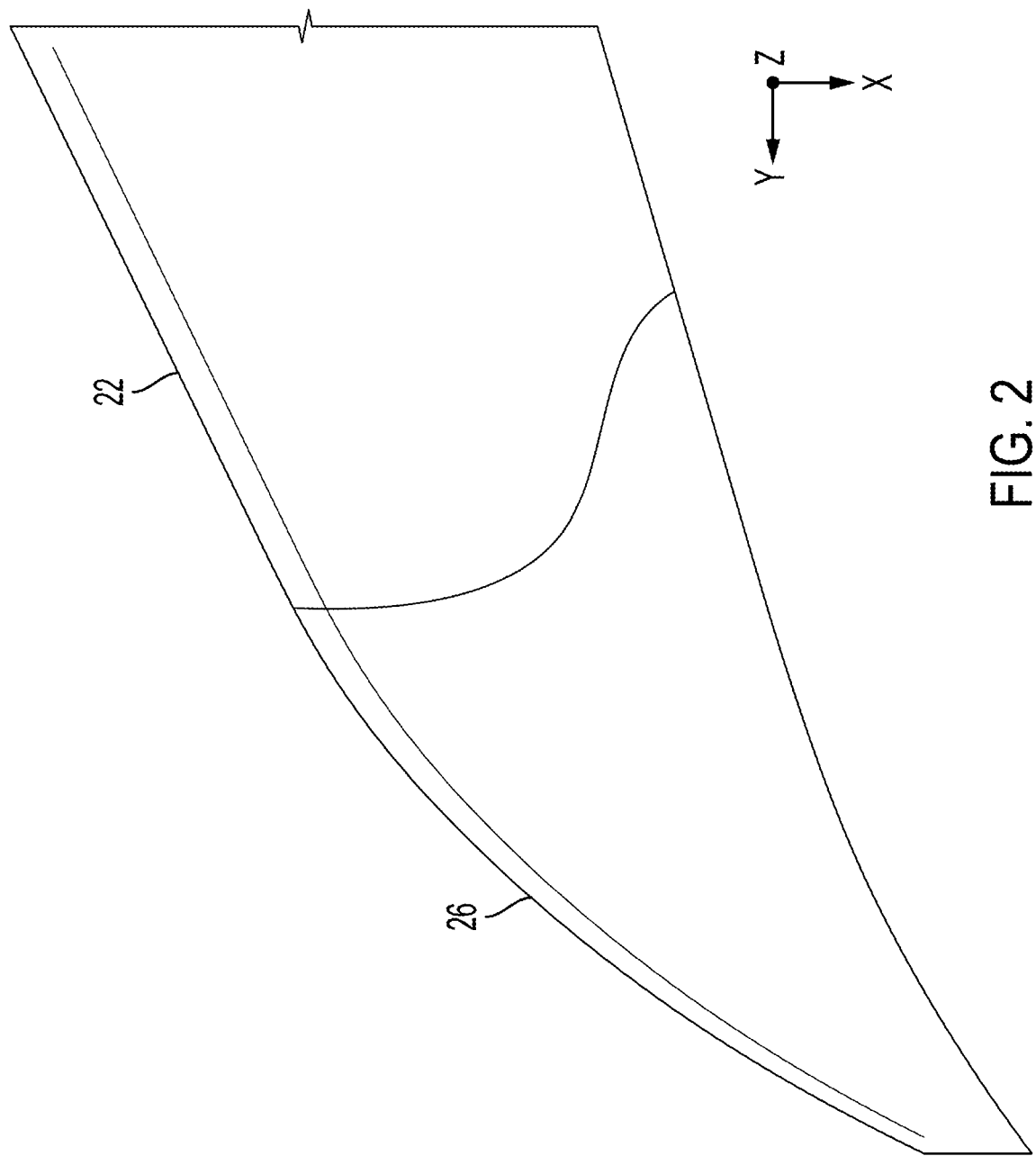
FIG. 2 shows a portion of the port wing of the aircraft of FIG. 1 with the wingtip in the extended position.

FIG. 1 is a diagrammatic representation of an exemplary embodiment of an aircraft 10 according to examples of the present disclosure. In other examples, the configurations and components of the present disclosure can be used with a wide variety of other aircraft having different form factors, sizes, and/or flight capabilities. The aircraft 10 comprises a fuselage 20, a starboard wing 12 and a port wing 18. In various examples, components of the aircraft 10 may be fabricated from metal, composite materials, polymeric materials, ceramic materials, and/or combinations thereof.

The fuselage 20 comprises an interior cabin that is configured to accommodate a payload, such as passengers and cargo. The starboard wing 12 and port wing 18 are coupled to the fuselage 20 and extend laterally from the fuselage. The starboard wing 12 comprises a starboard fixed wing 14 and a starboard wingtip 16 at an outboard end 15 of the starboard fixed wing. Similarly, the port wing 18 comprises a port fixed wing 22 and a port wingtip 26 at an outboard end 24 of the port fixed wing. As described in more detail below, the starboard wingtip 16 and the port wingtip 26 are coupled to their corresponding fixed wings in a manner that enables the wingtips to be moved from an extended position shown in FIG. 1 to a stowed position at least partially behind their corresponding fixed wing (see FIGS. 8 and 19).

Figure 7:
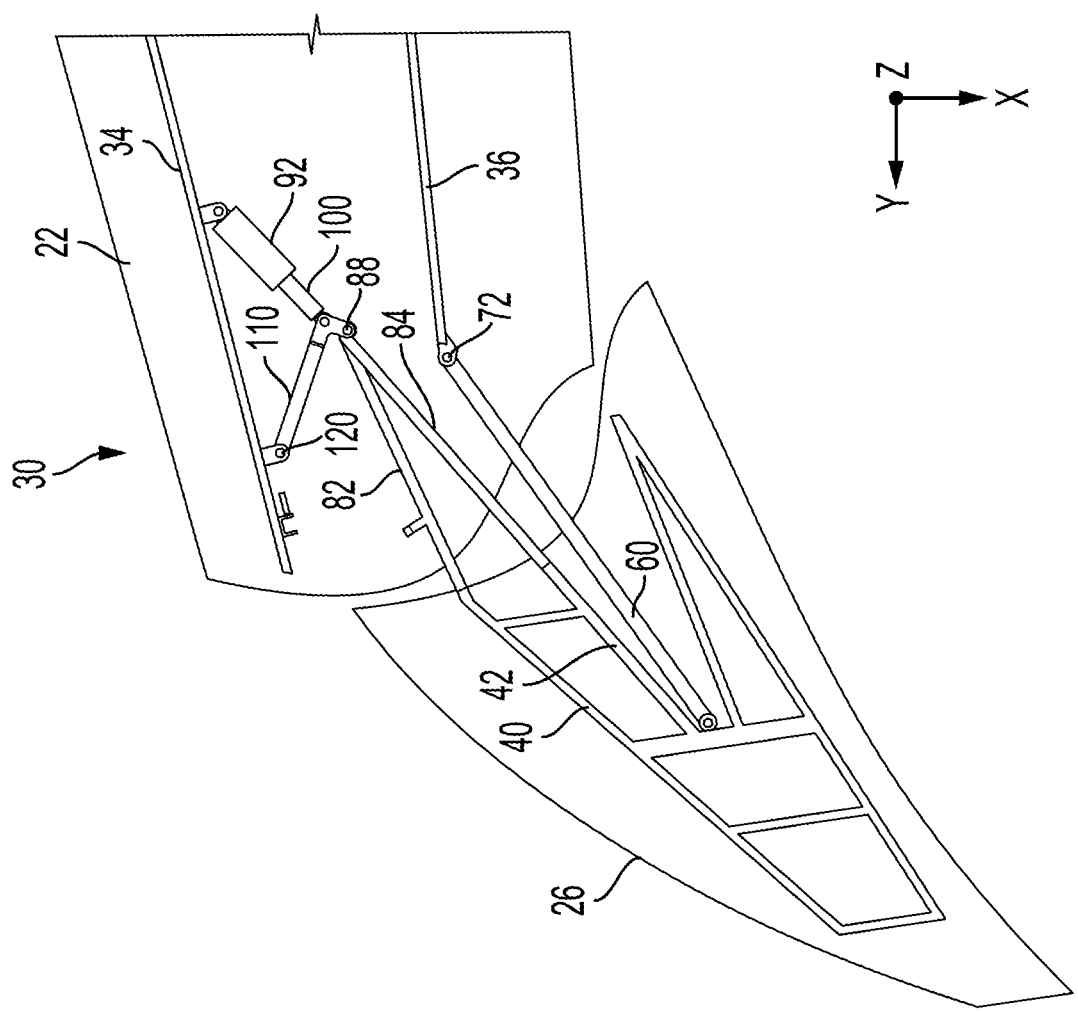
FIG. 7 is a partial view showing the wingtip in a middle position between the extended position and a stowed position.
Figure 8:
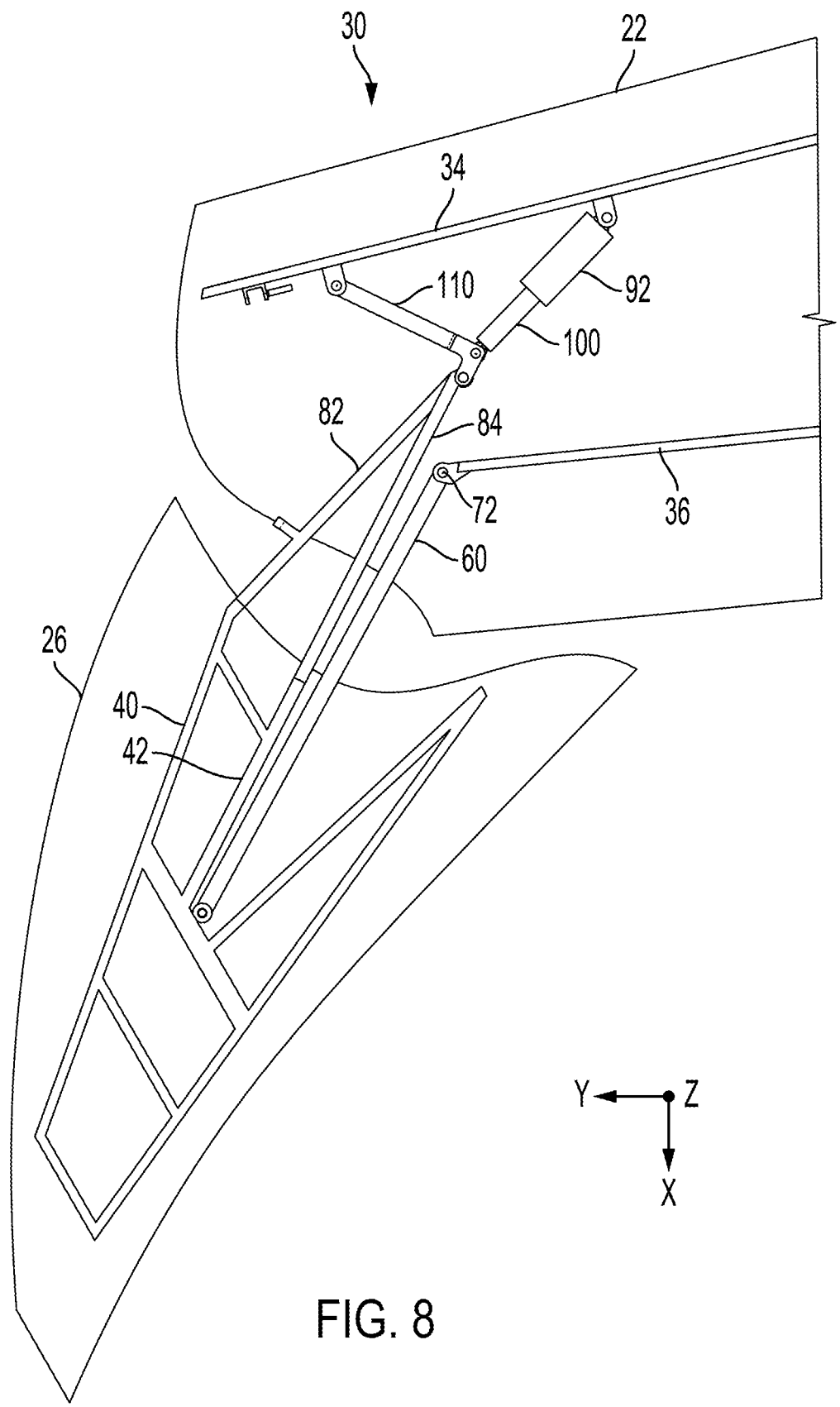
FIG. 8 is a partial view showing the wingtip in a stowed position at least partially behind the fixed wing.

FIGS. 2-6 show different views of portions of the port fixed wing 22 and the port wingtip 26 in the extended position, along with components of an apparatus 30 for moving the wingtip from the extended position to a stowed position at least partially behind the fixed wing according to one example of the present disclosure. FIG. 7 shows a view of the port wingtip 26 in a middle position between the extended position and a stowed position. FIG. 8 shows a view of the port wingtip 26 in the stowed position at least partially behind the port fixed wing 22. The following descriptions of the port fixed wing 22, port wingtip 26, and the apparatus 30 configured to move the wingtip at least partially behind the fixed wing apply equally to the starboard fixed wing 14 and starboard wingtip 16.

Figure 3:
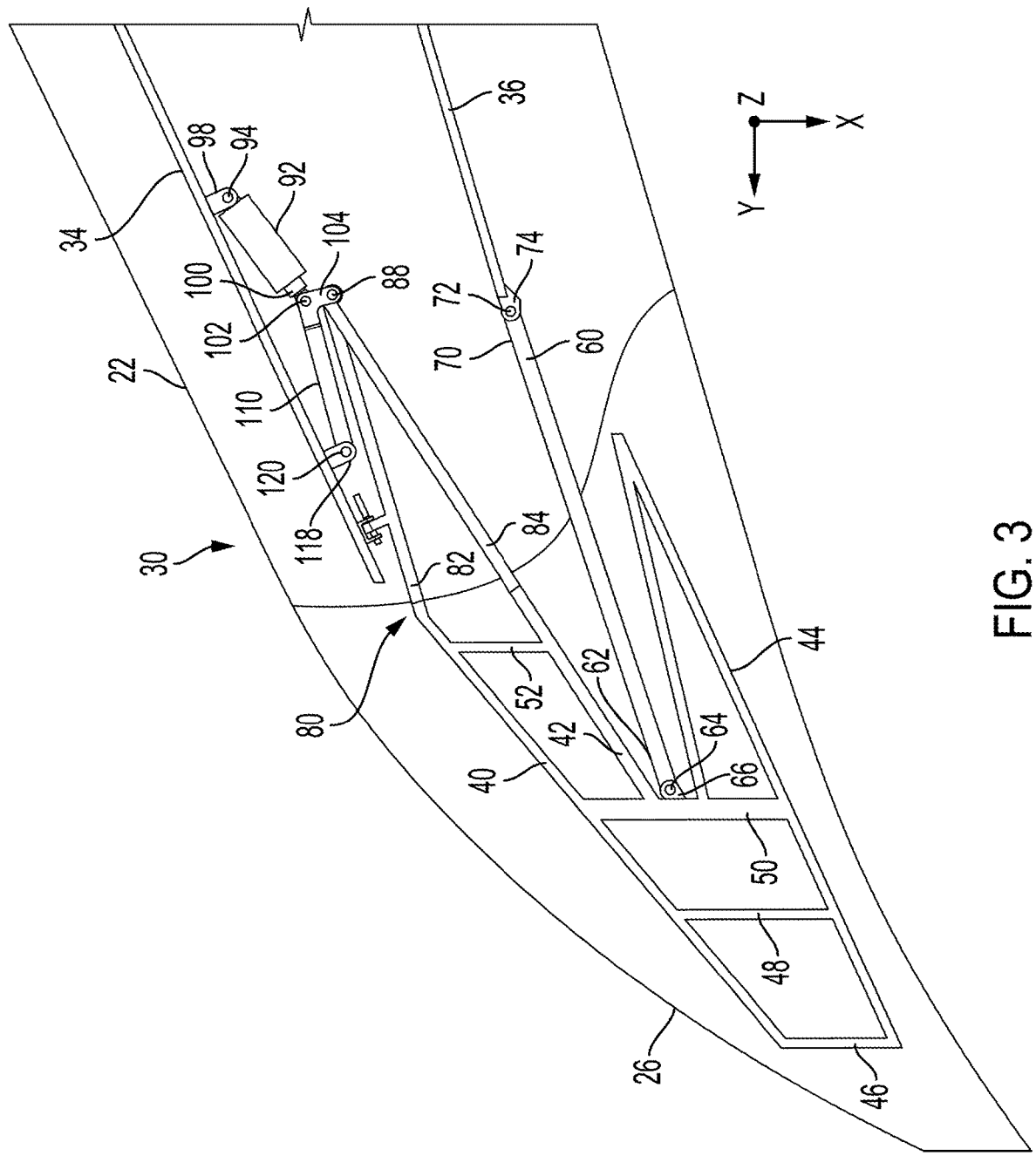
FIG. 3 shows the portion of the port wing of the aircraft of FIG. 2 with the upper skins removed to reveal components of an apparatus configured to move the wingtip at least partially behind the fixed wing according to one embodiment of the present disclosure.

With reference now to FIG. 3, the port fixed wing 22 includes a fixed wing front spar 34 and fixed wing rear spar 36. In some examples the fixed wing front spar 34 and fixed wing rear spar 36 extend from the fuselage 20 (not shown). As described in more detail below, in this example the fixed wing front spar 34 and fixed wing rear spar 36 provide structural support for components of the apparatus 30 that moves the port wingtip 26 at least partially behind the port fixed wing 22. Similarly, the port wingtip 26 includes a wingtip front spar 40 and wingtip rear spar 44, along with first rib 46, second rib 48, and third rib 50 extending between the wingtip front spar 40 and wingtip rear spar 44 that provide structural support for components of the apparatus 30.

With reference also to FIGS. 7 and 8, and as described in more detail below, the apparatus 30 comprises a linkage that enables the port wingtip 26 to move between the extended position of FIG. 3 to the stowed position of FIG. 8, and vice versa. In this example and with reference to FIGS. 3 and 4, the apparatus 30 includes a first link 60 that extends from the port wingtip 26 and is moveably coupled to the port fixed wing 22. More particularly, a wingtip end 62 of the first link 60 is rotatably coupled to the third rib 50 of the port wingtip 26 at a first link wingtip joint 64. In this example, the first link wingtip joint 64 comprises a first link wingtip joint bracket 66 extending from the third rib 50. A fixed wing end 70 of the first link 60 is rotatably coupled to the fixed wing rear spar 36 of the port fixed wing 22 at a first link fixed wing joint 72. In this example, the first link fixed wing joint 72 comprises a first link fixed wing joint bracket 74 extending from the first link 60.

In the present example, and in one potential advantage of the present disclosure, the first link wingtip joint 64 is located at the center of gravity of the port wingtip 26. In this manner, the loads experienced by apparatus 30 in moving the port wingtip 26 are evenly distributed about the components of the apparatus.

Figure 4:
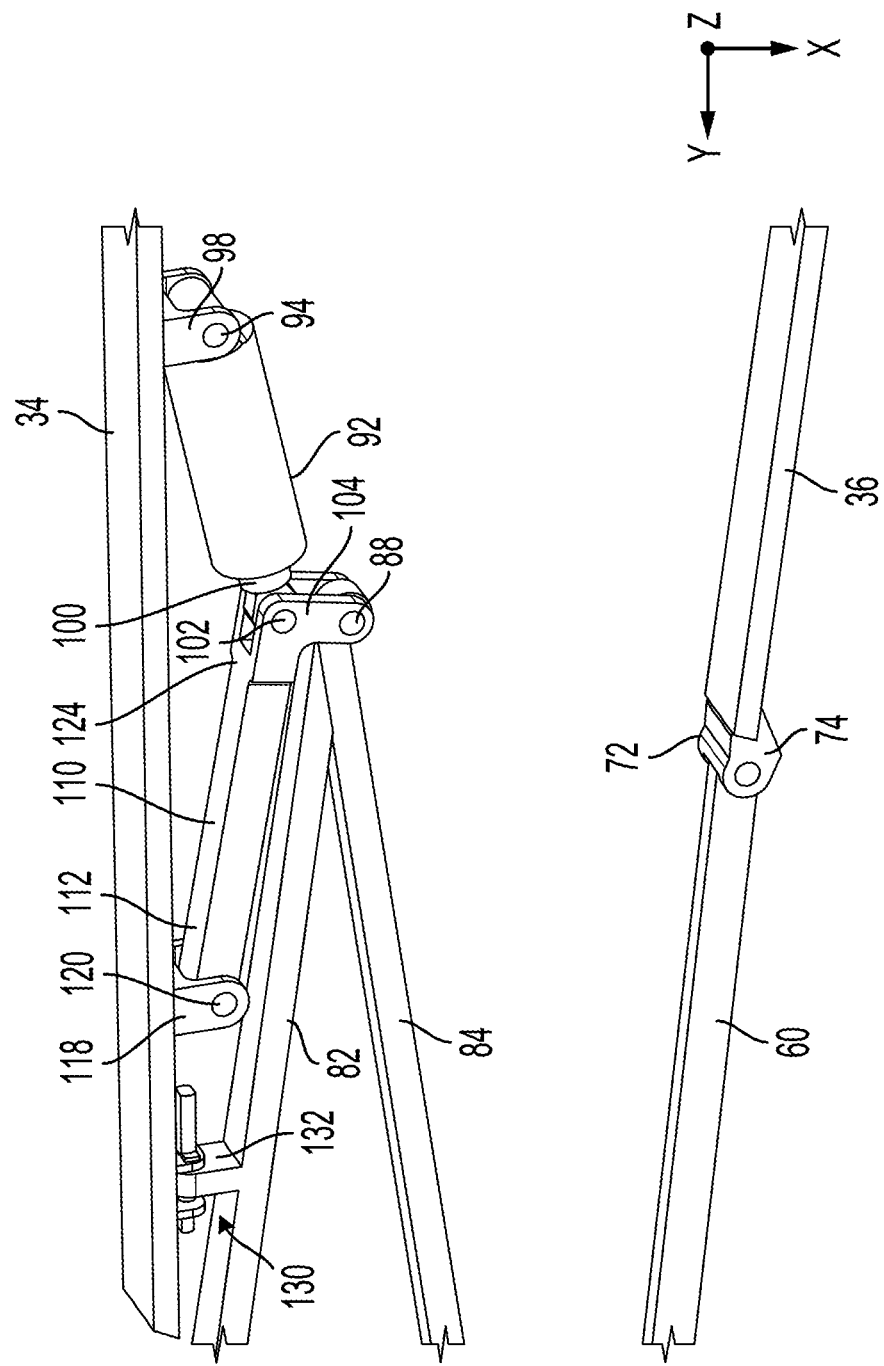
FIG. 4 shows a partial enlarged view of components of the apparatus of FIG. 3.

With continued reference to FIGS. 3 and 4, the apparatus 30 also includes a second link 80 that extends from the port wingtip 26 and is moveably coupled to the port fixed wing 22. More particularly, in this example the second link comprises a first connecting member 82 and a second connecting member 84 that are both affixed to and extend from the port wingtip 26, and are rotatably coupled to the port fixed wing 22 via a common second link joint 88. In this example, on the port wingtip 26 a fourth rib 52 connects and provides structural stability to the first connecting member 82 and second connecting member 84.

As shown in FIG. 3, in this example the first connecting member 82 is an extension of the wingtip front spar 40 and the second connecting member is an extension of a wingtip middle spar 42. In some examples, the first connecting member 82 and the wingtip front spar 40 may be fabricated as a single component, such as via additive manufacturing techniques. In other examples, the first connecting member 82 and the wingtip front spar 40 are separate components that are joined or bonded together. Similarly, the second connecting member 84 and the wingtip middle spar 42 may be fabricated as a single component, such as via additive manufacturing techniques. In other examples, the second connecting member 84 and the wingtip middle spar 42 are separate components that are joined or bonded together.

With continued reference to FIGS. 3 and 4, the apparatus 30 includes an actuator 92 that is rotatably coupled to the port fixed wing 22 via an actuator joint 94. The actuator joint 94 comprises an actuator mounting bracket 98 that extends from the fixed wing front spar 34. In this example, the actuator 92 comprises a piston 100 that is rotatably coupled to a piston joint 102 at a second link joint bracket 104. In other examples, the actuator can take the form of a leadscrew, jack screw, or any other suitable mechanism. In this example, the second link joint bracket 104 comprises both the second link joint 88 and the piston joint 102. As described in more detail below, the actuator 92 is configured to extend the piston 100 to move the second link (in this example, the first connecting member 82 and second connecting member 84) and cause the port wingtip 26 to move between the extended position and the stowed position.

The second link joint bracket 104 is rotatably coupled to the fixed wing front spar 34 via a third link 110. As shown in FIG. 4, a mounting end 112 of the third link 110 is rotatably coupled to the fixed wing front spar 34 of the port fixed wing 22 via a third link mounting bracket 118 that comprises a front spar joint 120. A piston end 124 of the third link 110 is rotatably coupled to the piston 100.

With reference now to FIGS. 7 and 8, to move the port wingtip 26 from the extended position shown in FIG. 3 to the stowed position of FIG. 8, the actuator 92 extends the piston 100 to cause the third link 110 to rotate in a clockwise direction about the front spart joint 120. This movement in turn causes the first link 60 and the first and second connecting members 82, 84 to rotate counter-clockwise about the first link fixed wing joint 72 and second link joint 88, respectively. As shown in FIGS. 7 and 8, this movement causes the port wingtip 26 to move at least partially behind the port fixed wing 22 to a stowed position.

Figure 9:
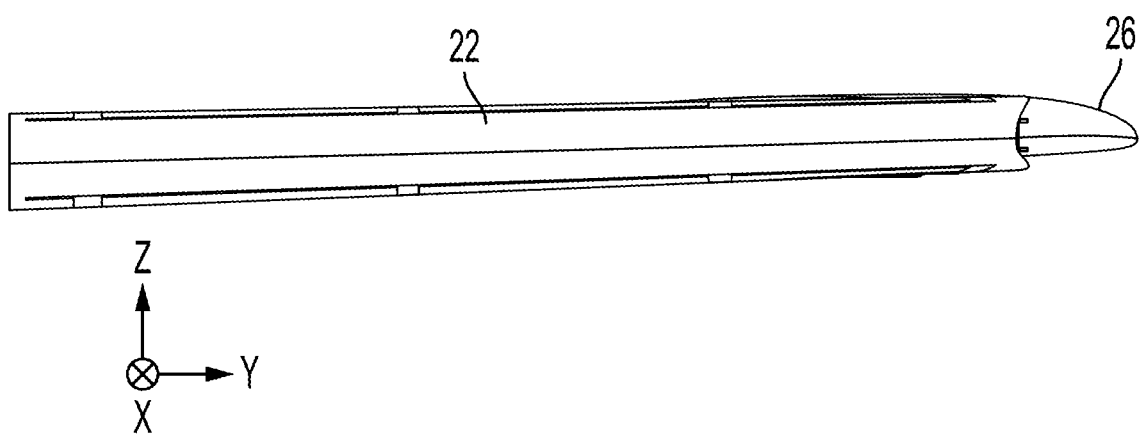
FIG. 9 shows a partial front view of the fixed wing with the wingtip in the stowed position.

Accordingly, and in one potential advantage of the present disclosure, by moving the port wingtip 26 (and starboard wingtip 16) at least partially behind the fixed wing, the wingspan of the aircraft 10 is reduced to allow passage of the aircraft through narrower passageways, such as gates, hangers and storage facilities. Additionally, moving the wingtips in this manner helps to provide space between an airplane landing on a runway and an airplane taxiing (with wingtips folded back) on a taxiway that runs parallel with the runway. Additionally and with reference also to FIG. 9, in this example the port wingtip 26 in the stowed position is substantially coplanar with the port fixed wing 22. Further, in moving the port wingtip 26 between the extended position and the stowed position, the apparatus 30 maintains the wingtip substantially in the x-y plane and coplanar with the port fixed wing 22.

Advantageously, by maintaining the port wingtip 26 substantially in the x-y plane as it is moved into the stowed position, and keeping the wingtip in this plane while stowed, the apparatus 30 maintains the wingtip's aerodynamic profile between the extended and stowed positions. In this manner, the apparatus 30 avoids "barn door effects" that can be created by other mechanisms that raise or lower the wingtip in the z-axis direction, which exposes some or all of the wingtip's surface area to exterior winds. As such exterior winds can produce significant forces opposing movement of a wingtip to a stowed position, these other configurations require more robust and powerful mechanisms to move and stow the wingtips. In the present configurations, by maintaining the port wingtip 26 substantially in the x-y plane as it is moved into the stowed position, and keeping the wingtip in this plane while stowed, potential wind forces opposing movement and storage of the wingtip in the stowed position are significantly reduced. Accordingly and advantageously, the present configurations minimize folding loads and system power requirements, thereby enabling the use of smaller actuators and structural components to conserve valuable space within the wingtip and fixed wing.

Figure 5:
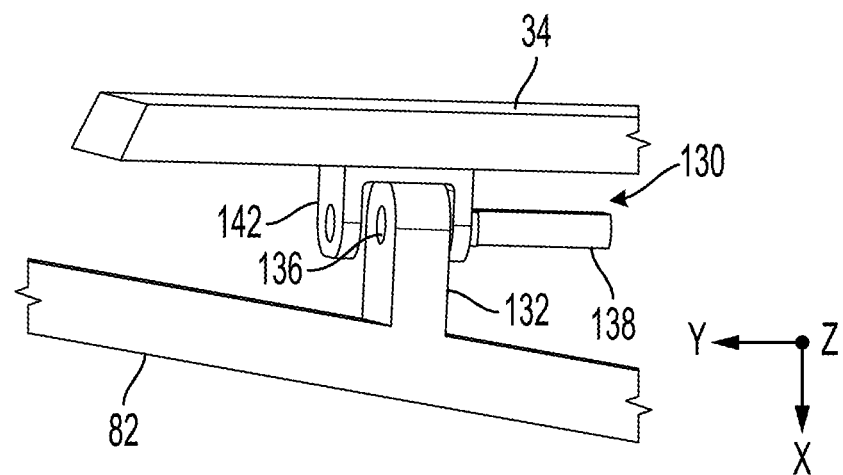
FIG. 5 shows a latch extension and a latch actuator with a latch pin in a retracted position.
Figure 6:
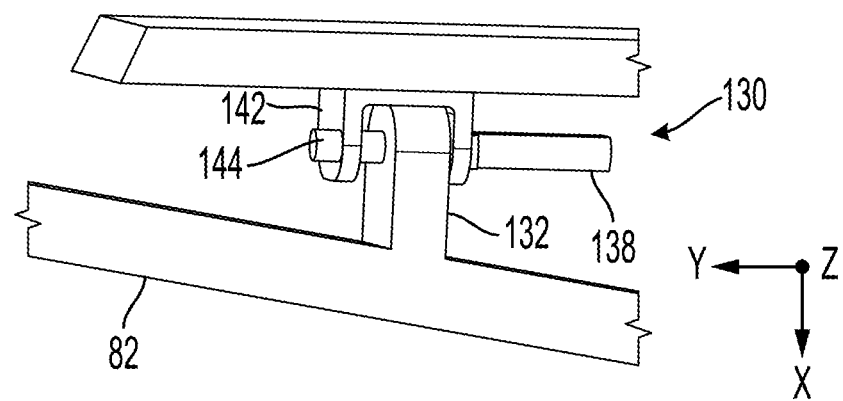
FIG. 6 shows the latch extension and latch actuator of FIG. 5 with the latch pin in an extended position to lock the wingtip in an extended position.

With reference now to FIGS. 4-6, the apparatus 30 includes a latch pin assembly 130 that is configured to releasably lock the port wingtip 26 in the extended position. The latch pin assembly 130 includes a latch extension 132 that extends from the first connecting member 82 and defines a latch aperture 136. The apparatus 30 further comprises a latch actuator 138 affixed to the fixed wing front spar 34 of the port fixed wing 22 at a latch bracket 142 that extends from the fixed wing front spar. The latch actuator 138 is configured to extend a latch pin 144 through the latch aperture 136 of the latch extension 132 and through corresponding apertures defined in the latch bracket 142 to lock the port wingtip 26 in the extended position. In one example the latch actuator 138 is fluidically coupled to a pressurized fluid source (not shown) to selectively extend and retract the latch pin 144. In other examples, the latch pin 144 can be actuated by other types of power sources, such as a solenoid or leadscrew. Accordingly, and in another potential advantage of the present disclosure, this feature ensures the port wingtip 26 remains securely oriented in the extended position when the aircraft is in flight.

In other examples, a variety of other mechanisms, including but not limited to hook mechanisms, can be used to lock the port wingtip 26 in the extended position.

As noted above, the starboard fixed wing 14 and starboard wingtip 16 utilize the same mechanisms and components for moving the starboard wingtip at least partially behind the starboard fixed wing as described above for the port wingtip 26 and port fixed wing 22.

Figure 10:
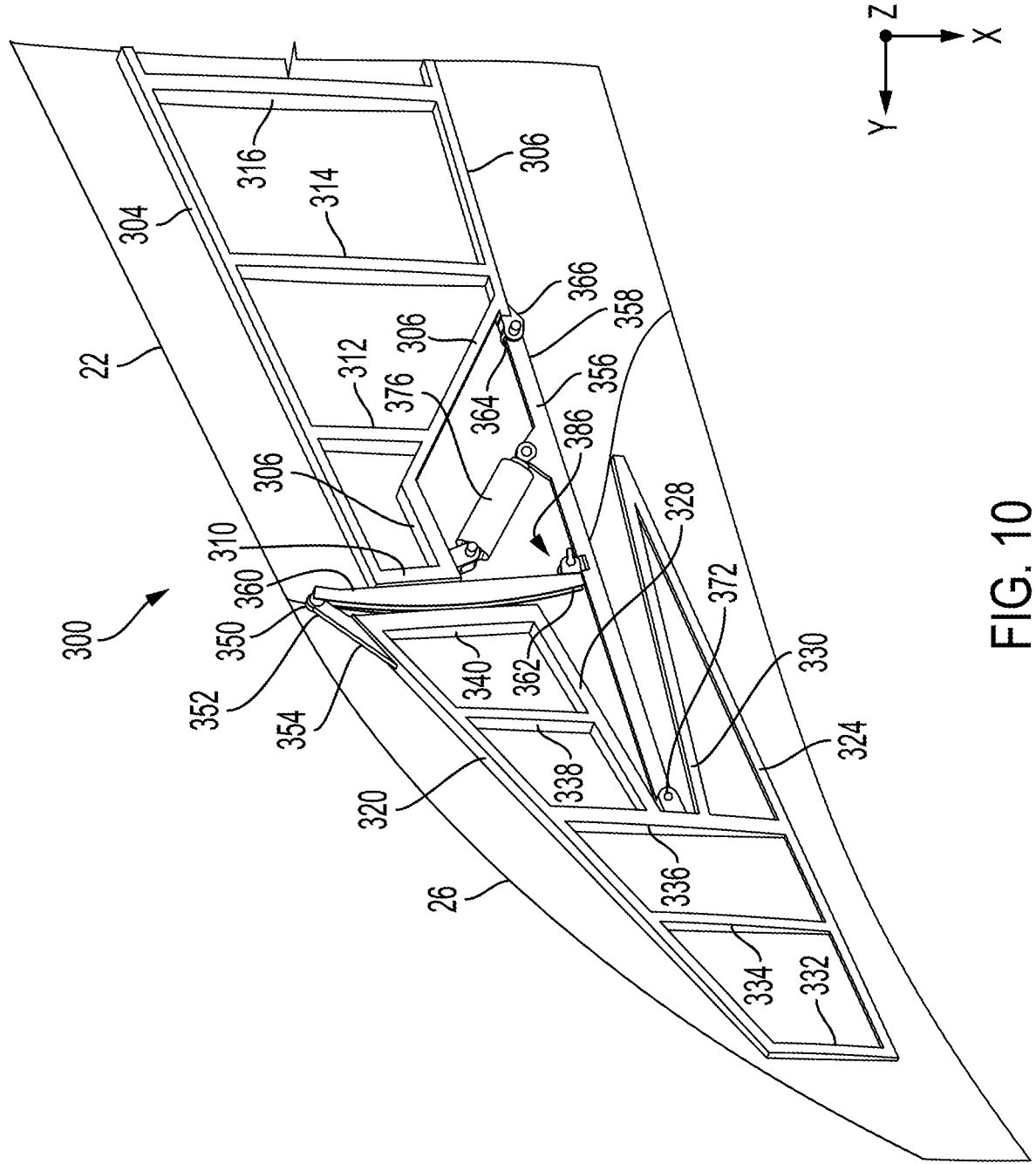
FIG. 10 shows another example of an apparatus configured to move the wingtip at least partially behind the fixed wing according to another embodiment of the present disclosure.
Figure 11:
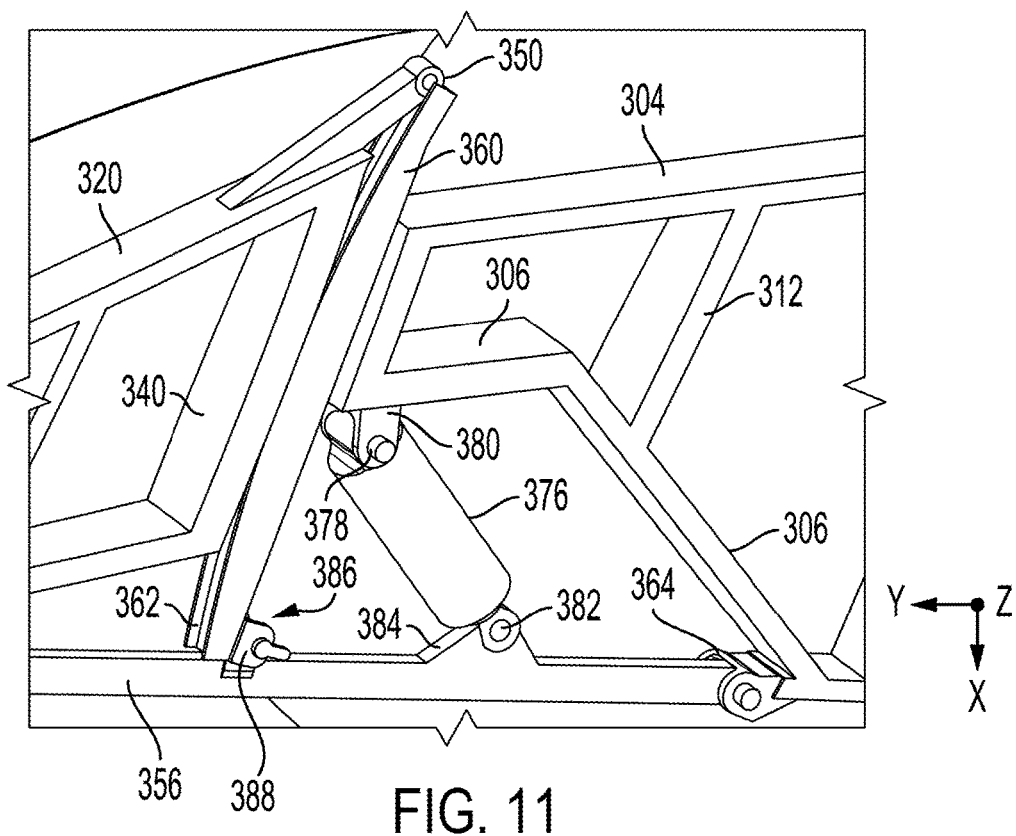
FIG. 11 shows a partial enlarged view of components of the apparatus of FIG. 10.
Figure 12:
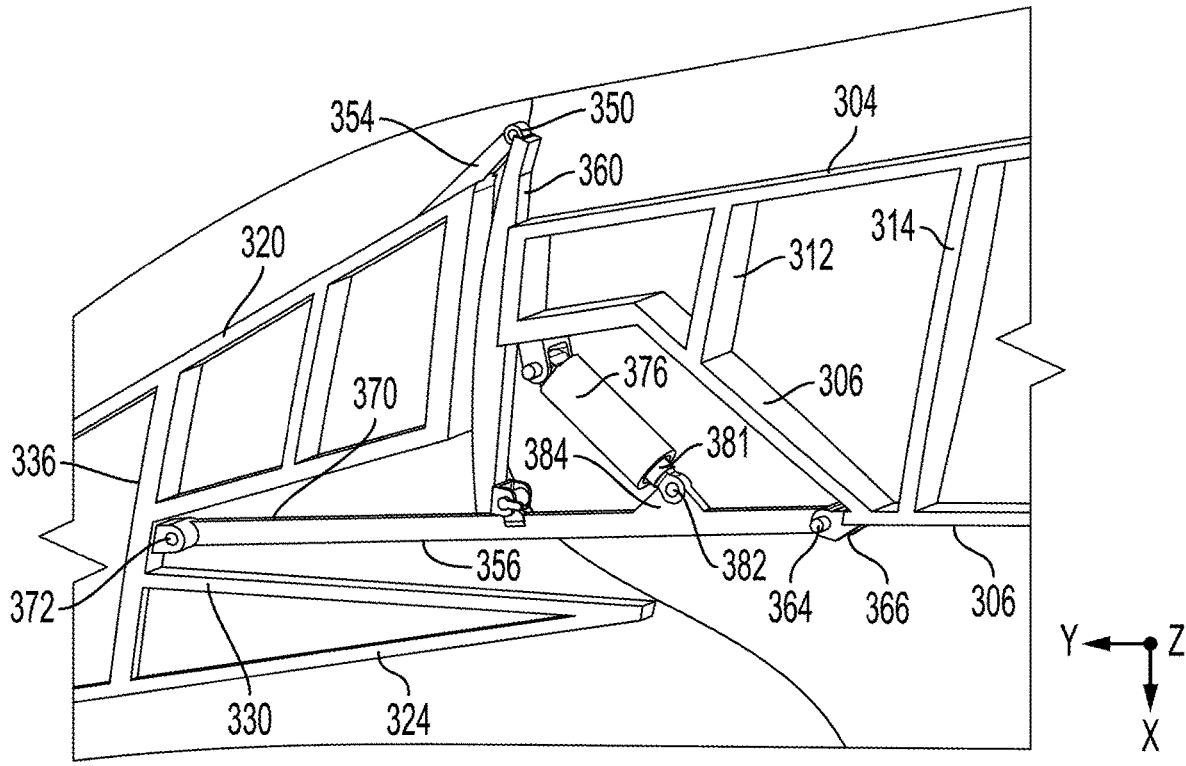
FIG. 12 shows another view of the components of the apparatus of FIG. 11.
Figure 17:
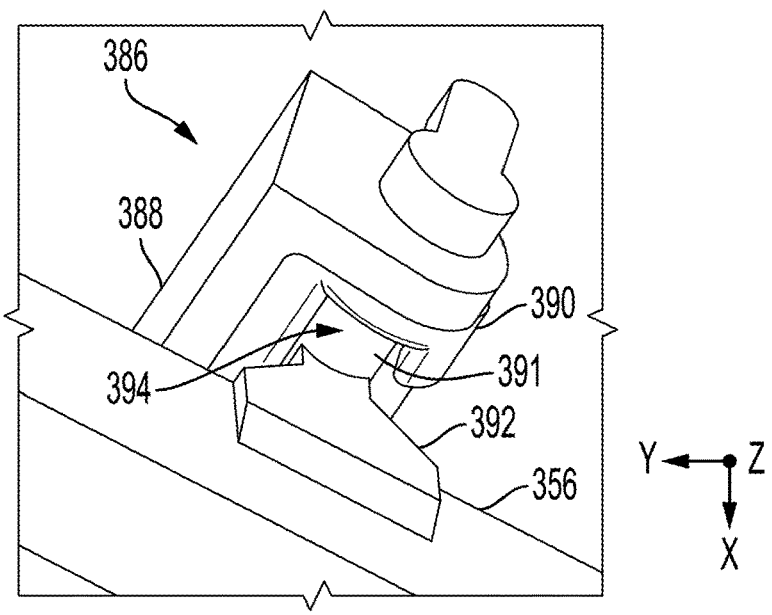
FIG. 17 shows the latch assembly rotated to an open position.
Figure 16:
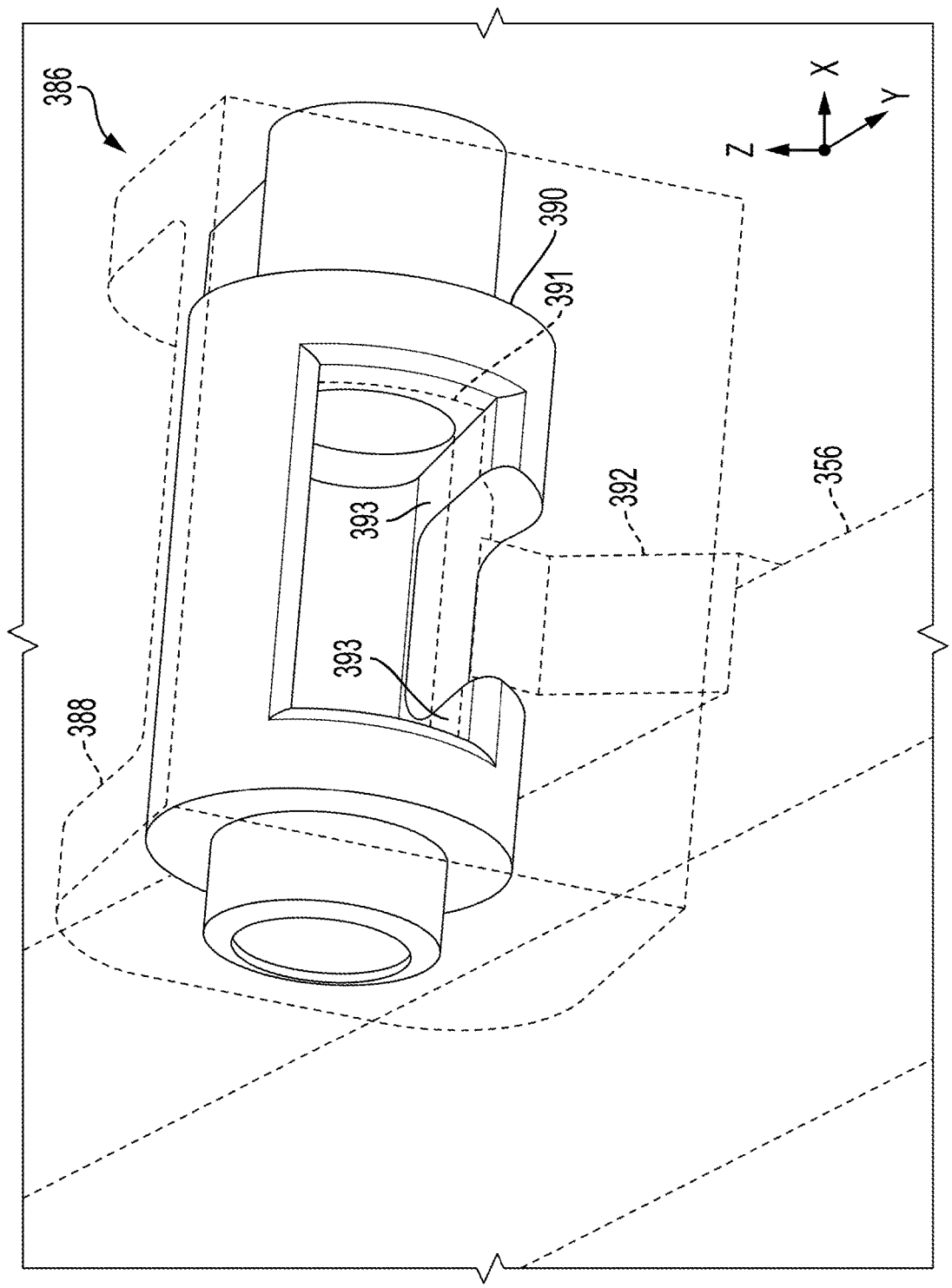
FIG. 16 shows an enlarged partial view of the latch cylinder and captured latch stay in the closed position.
Figure 18:
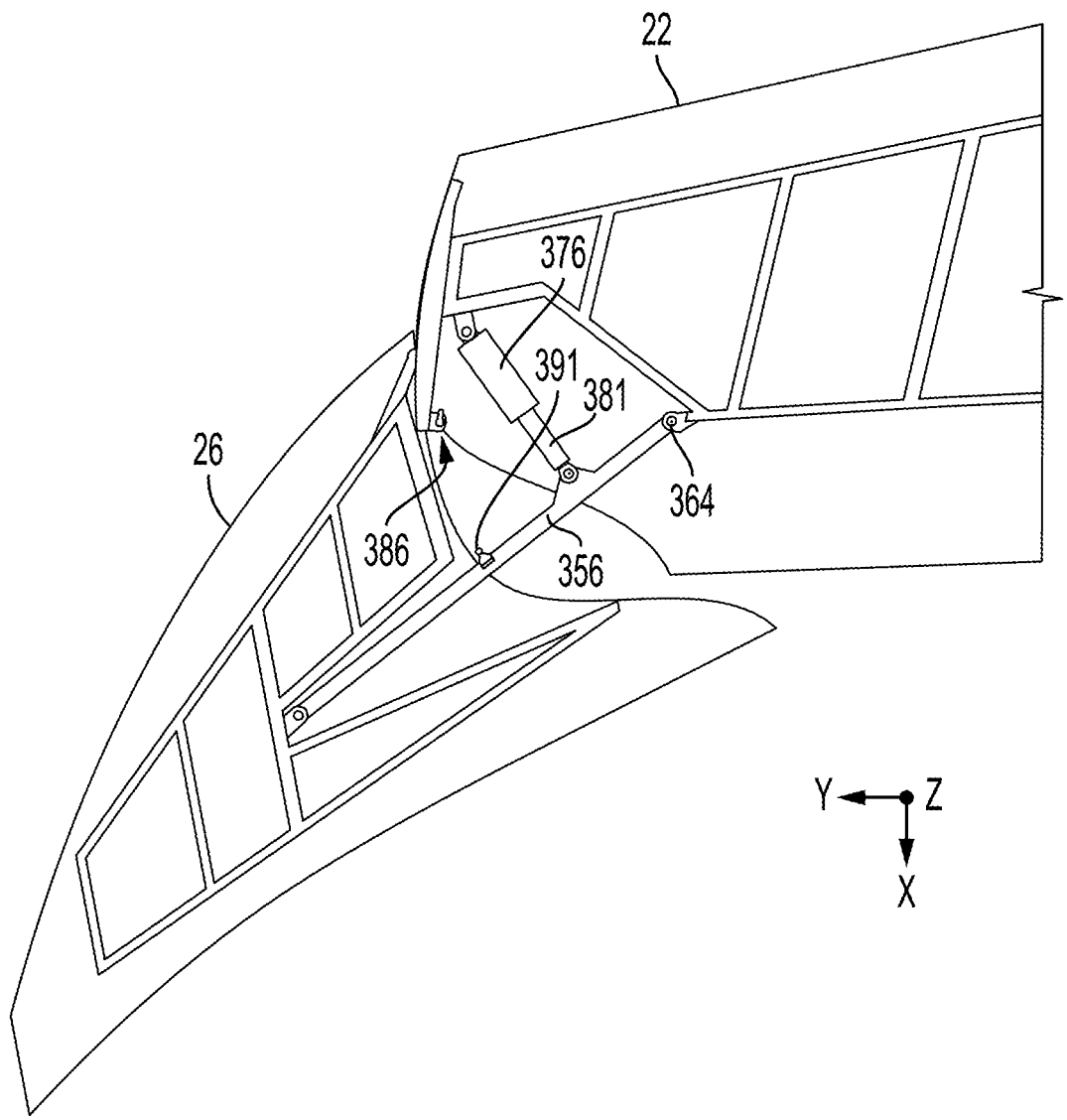
FIG. 18 shows a partial view of the wingtip in a middle position between the extended position and a stowed position.
Figure 19:
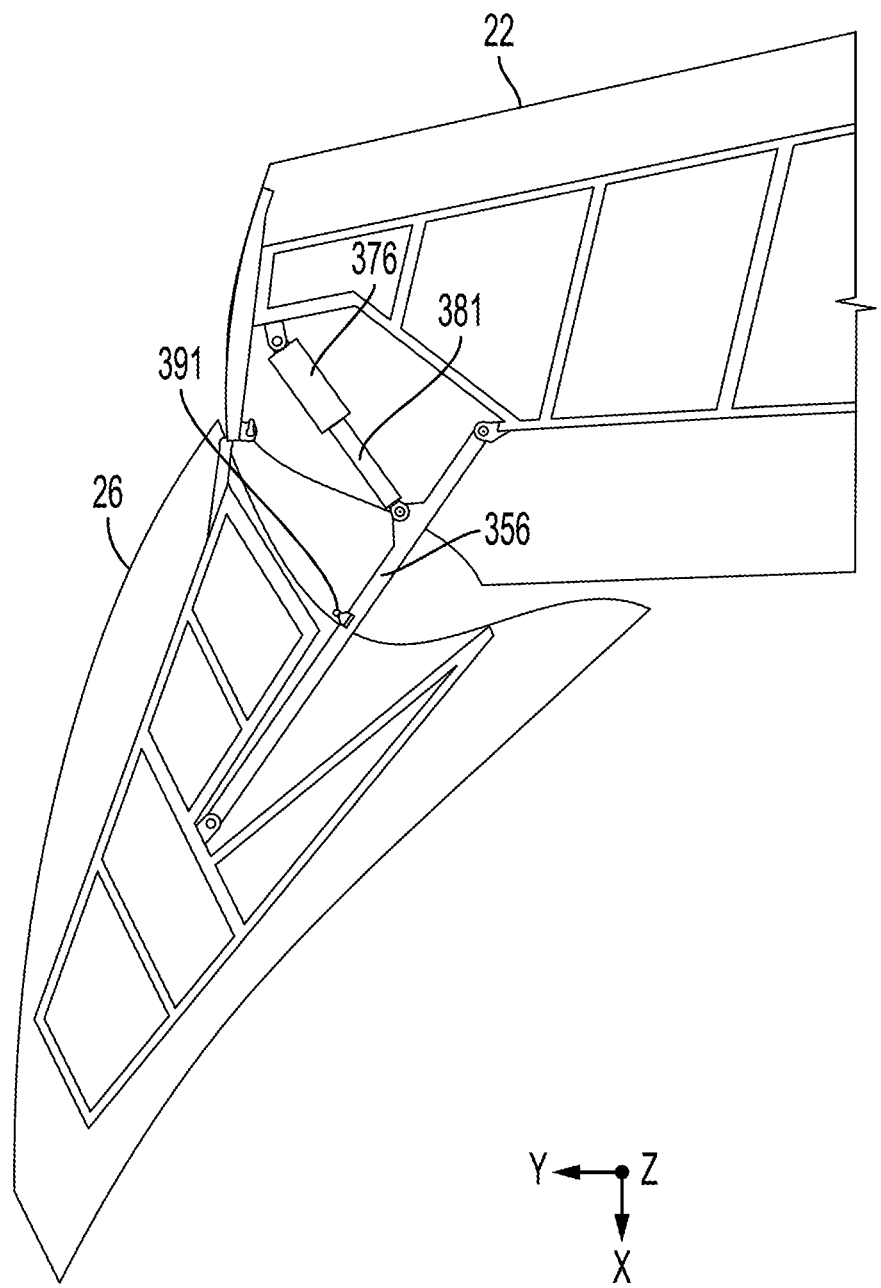
FIG. 19 is a partial view of the wingtip in a stowed position at least partially behind the fixed wing.

FIGS. 10-19 illustrate another apparatus 300 for moving a wingtip from the extended position to a stowed position at least partially behind a fixed wing according to another example of the present disclosure. FIGS. 10-12 show different views of portions of the port fixed wing 22 and the port wingtip 26 in the extended position, along with components of the apparatus 300. FIG. 18 shows a view of the port wingtip 26 in a middle position between the extended position and a stowed position. FIG. 19 shows a view of the port wingtip 26 in the stowed position at least partially behind the port fixed wing 22. The following descriptions of the port fixed wing 22, port wingtip 26, and the apparatus 300 configured to move the wingtip at least partially behind the fixed wing apply equally to the starboard fixed wing 14 and starboard wingtip 16.

With reference now to FIG. 10, the port fixed wing 22 includes a fixed wing front spar 304 and fixed wing rear spar 306. In some examples the fixed wing front spar 304 and fixed wing rear spar 306 extend from the fuselage 20 (not shown). A first fixed wing rib 310, second fixed wing rib 312, third fixed wing rib 314, and fourth fixed wing rib 316 extend between the fixed wing front spar 304 and fixed wing rear spar 306. As described in more detail below, the fixed wing front spar 304, fixed wing rear spar 306, and ribs provide structural support for components of the apparatus 300 that moves the port wingtip 26 at least partially behind the port fixed wing 22. Similarly, the port wingtip 26 includes a wingtip front spar 320, wingtip rear spar 324, first wingtip middle spar 328, and second wingtip middle spar 330. First rib 332, second rib 334, and third rib 336 extend between the wingtip front spar 320 and wingtip rear spar 324. Fourth rib 338 and fifth rib 340 extend between the first wingtip middle spar 328 and wingtip front spar 320. These components provide structural support for components of the apparatus 300 and port fixed wing 22 and port wingtip 26.

With reference also to FIGS. 11 and 19, and as described in more detail below, the apparatus 300 comprises a roller 350 and corresponding track 360 that enables the port wingtip 26 to move between the extended position of FIG. 10 and the stowed position of FIG. 19, and vice versa. In this example and with reference to FIGS. 10-12, the roller 350 is located at a fixed wing end 352 of a first link 354 that extends from the port wingtip 26. In this example, the first link 354 extends from the wingtip front spar 320. A track 360 is affixed to the port fixed wing 22 and defines an elongated channel 362. As described further below, the roller 350 extends into the elongated channel 362 and is configured to roll within the channel to guide movement of the port wingtip 26 between the extended position and the stowed position.

Figure 13:
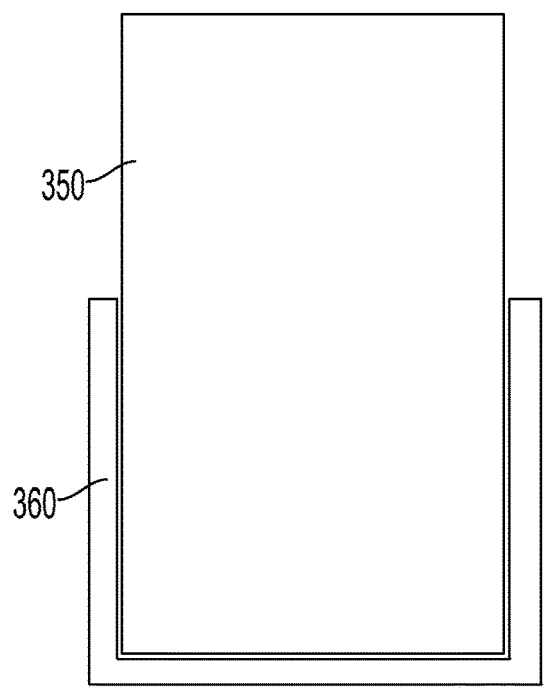
FIG. 13 shows a cross section view of a roller and track of the apparatus of FIG. 10 according to one example of the present disclosure.
Figure 14:
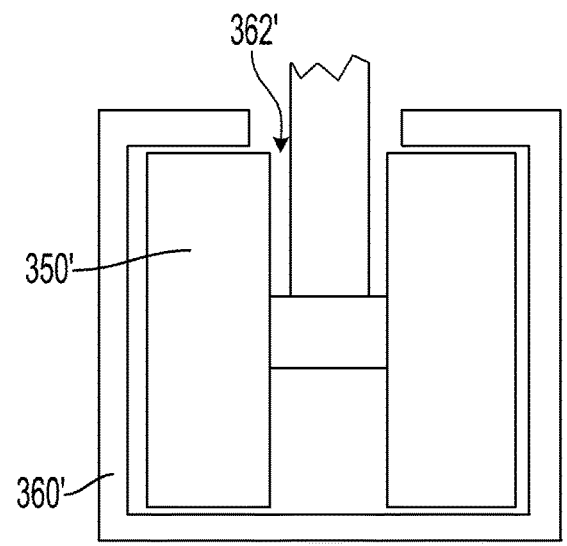
FIG. 14 shows a cross section view of another roller and track according to another example of the present disclosure.
Figure 15:
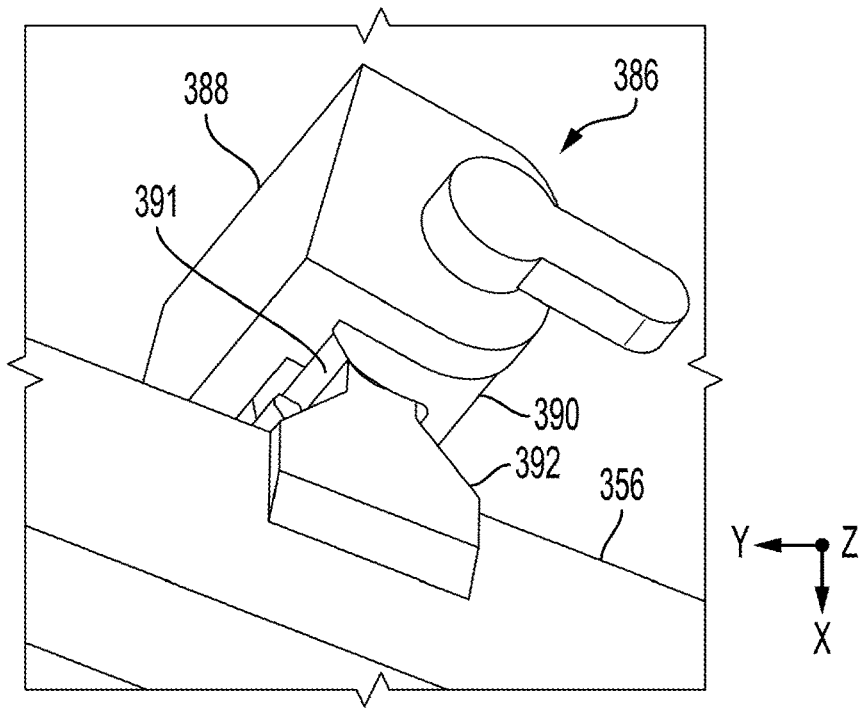
FIG. 15 shows a latch assembly housing containing a rotatable latch cylinder and captured latch stay in a closed position that locks the wingtip in the extended position.

In one example and with reference also to FIG. 13, the track 360 comprises a U-shaped cross section that defines the channel 362, and the roller 350 extends into the elongated channel. In other examples, the track comprises a configuration that moveably captures the roller. In one example and with reference to FIG. 14, a track 360' includes opposing C-shaped cross sections that moveable capture a roller 350' within a partially enclosed channel 362'.

With reference to FIGS. 10-12, a second link 356 spaced from the first link 354 rotatably couples the port wingtip 26 to the port fixed wing 22. More particularly, a fixed wing end 358 of the second link 356 is rotatably coupled to the fixed wing rear spar 306 of the port fixed wing 22 at a second link fixed wing joint 364. In this example, the second link fixed wing joint 364 comprises a second link wingtip joint bracket 366 extending from the fixed wing rear spar 306. A wingtip end 370 of the second link 356 is rotatably coupled to the third support rib 336 of the port wingtip 26 at a second link wingtip joint 372.

In the present example, and in one potential advantage of this configuration, the second link wingtip joint 372 is located at the center of gravity of the port wingtip 26. In this manner, the loads experienced by apparatus 300 in moving the port wingtip 26 are evenly distributed about the components of the apparatus.

With reference to FIGS. 11 and 12, the apparatus 300 includes an actuator 376 that is rotatably coupled to the port fixed wing 22 via an actuator joint 378. The actuator joint 378 comprises an actuator mounting bracket 380 that extends from the fixed wing rear spar 306. In this example, the actuator 376 comprises a piston 381 that is rotatably coupled to a piston joint 382 at a second link joint bracket 384 extending from the second link 356. In other examples, the actuator can take the form of a leadscrew, jack screw, or any other suitable mechanism As described in more detail below, the actuator 376 is configured to extend the piston 381 to move the second link 356 and cause the port wingtip 26 to move between the extended position and the stowed position, as guided by the roller 350 rolling within track 360.

With reference now also to FIGS. 18 and 19, to move the port wingtip 26 from the extended position shown in FIG. 10 to the stowed position of FIG. 19, the actuator 376 extends the piston 381 to cause the second link 356 to rotate in a counter-clockwise direction about the second link fixed wing joint 364. This movement in turn causes the roller 350 to roll downwardly in the x-axis direction within the channel 362 of track 360. As shown in FIGS. 18 and 19, this movement causes the port wingtip 26 to move at least partially behind the port fixed wing 22 to a stowed position.

Accordingly, and like the other example apparatus described above, by moving the port wingtip 26 (and starboard wingtip 16) at least partially behind the fixed wing, the apparatus 300 selectively reduces the wingspan of the aircraft 10 to allow passage through narrower passageways, such as gates, hangers and storage facilities. Additionally, in this example the apparatus 300 moves the port wingtip 26 to a stowed position that is substantially coplanar with the port fixed wing 22. Further, in moving the port wingtip 26 between the extended position and the stowed position, the apparatus 30 maintains the wingtip substantially in the x-y plane.

Advantageously, by maintaining the port wingtip 26 substantially in the x-y plane as it is moved into the stowed position, and keeping the wingtip in this plane while stowed, the apparatus 300 maintains the wingtip's aerodynamic profile between the extended and stowed positions. In this manner, the apparatus 300 avoids "barn door effects" that can be created by other mechanisms that raise or lower the wingtip in the z-axis direction, which exposes some or all of the wingtip's surface area to exterior winds. As such exterior winds can produce significant forces opposing movement of a wingtip to a stowed position, these other configurations require more robust and powerful mechanisms to move and stow the wingtips. In the present configurations, by maintaining the port wingtip 26 substantially in the x-y plane as it is moved into the stowed position, and keeping the wingtip in this plane while stowed, potential wind forces opposing movement and storage of the wingtip in the stowed position are significantly reduced. Accordingly and advantageously, the present configurations minimize folding loads and system power requirements, thereby enabling the use of smaller actuators and structural components to conserve valuable space within the wingtip and fixed wing.

With reference now to FIGS. 10-11 and 15-17, the apparatus 300 includes a latch assembly 386 that is configured to releasably lock the port wingtip 26 in the extended position. In this example, the latch assembly 386 includes a latch housing 388 that is affixed to a trailing end of the track 360.

As described further below, the latch assembly 386 is configured to releasably capture a latch stay 391 affixed to the second link 356 to lock the port wingtip 26 in the extended position.

FIGS. 10-12 and 15-16 show the latch assembly 386 in a locked position. More particularly and with reference to FIG. 16, in this example a rotatable latch cylinder 390 in a closed position captures a cylindrical latch stay 391 that is affixed to the second link 356 at the end of a latch extension 392 extending from the second link. In this configuration, interior retention surfaces 393 of the latch cylinder 390 capture and prevent the latch stay 391 (and attached second link 356) from moving.

As shown in FIG. 17, when the latch cylinder 390 is rotated approximately 90 degrees in a counter-clockwise direction, the interior retention surfaces 393 are rotated to one side of the latch stay 391 and a latch opening 394 defined in the latch cylinder 390 is positioned beneath the latch stay. Accordingly, the latch stay 391 is now free to translate in the x-axis direction, thereby allowing the second link 356 and attached port wingtip 26 to move from the extended position to the stowed position as described above.

In one example the latch assembly 386 is fluidically coupled to a pressurized fluid source (not shown) to selectively rotate the latch cylinder 390 between open and locked positions. In other examples, the latch cylinder 390 can be actuated by other types of power sources, such as a solenoid. Accordingly, and in another potential advantage of the present disclosure, this feature ensures the port wingtip 26 remains securely oriented in the extended position when the aircraft is in flight.

As noted above, in other examples a variety of other mechanisms, including but not limited to hook mechanisms, can be used to lock the port wingtip 26 in the extended position. Also noted above, the starboard fixed wing 14 and starboard wingtip 16 can utilize the same mechanisms and components for moving the starboard wingtip at least partially behind the starboard fixed wing as described above for the port wingtip 26 and port fixed wing 22.

FIG. 20 is a flowchart of an example method 400 of shortening a wingspan of an aircraft. The following description of method 400 is provided with reference to the components described herein and shown in FIGS. 1-19. In other examples, the method 400 is performed in other contexts using other suitable components.

At 402, the method 400 includes providing an apparatus for moving a wingtip at least partially behind a fixed wing of the aircraft, the apparatus comprising: a first link extending from a wingtip of the aircraft and moveably coupled to a fixed wing of the aircraft; a second link extending from the wingtip and moveably coupled to the fixed wing; and an actuator coupled to the fixed wing and to the second link. At 406 the method 400 includes positioning the wingtip at an outboard end of the fixed wing. At 410 the method 400 includes extending the actuator to move the second link and cause the wingtip to move at least partially behind the fixed wing.

The concepts described herein are broadly applicable to any suitable type of aircraft, including conventional take-off & landing aircraft, short take-off & landing aircraft, short take-off & vertical landing aircraft, vertical take-off and landing aircraft, and manned and unmanned aircraft.

The present disclosure includes all novel and non-obvious combinations and sub-combinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

Further, the disclosure comprises configurations according to the following clauses.

Clause 1. An apparatus for shortening a wingspan of an aircraft, the apparatus comprising: a first link extending from a wingtip of the aircraft and moveably coupled to a fixed wing of the aircraft; a second link extending from the wingtip and moveably coupled to the fixed wing; and an actuator coupled to the fixed wing and to the second link; wherein the actuator is configured to move the second link and cause the wingtip to move between an extended position and a stowed position.

Clause 2. The apparatus of clause 1, wherein the wingtip in the stowed position is substantially coplanar with the fixed wing.

Clause 3. The apparatus of clause 1, further comprising a third link comprising an actuator piston end rotatably coupled to the piston actuator and a mounting end rotatably coupled to the fixed wing.

Clause 4. The apparatus of clause 3, wherein the second link comprises a first connecting member and a second connecting member.

Clause 5. The apparatus of clause 4, wherein the first connecting member comprises a latch extension that defines a latch aperture, and the apparatus further comprises a latch actuator affixed to a fixed wing front spar of the fixed wing, the latch actuator configured to extend a latch pin through the latch aperture of the latch extension to lock the wingtip in the extended position.

Clause 6. The apparatus of clause 4, wherein the first connecting member and the second connecting member are rotatably coupled to the fixed wing at a second link joint.

Clause 7. The apparatus of clause 6, wherein the second link joint is coupled to an actuator piston joint, and the piston of the actuator is rotatably coupled to the piston actuator joint.

Clause 8. The apparatus of clause 7, wherein the actuator is rotatably coupled to the fixed wing at an actuator joint.

Clause 9. The apparatus of clause 1, wherein a fixed wing end of the first link is rotatably coupled to a fixed wing rear spar of the fixed wing at a first link fixed wing joint.

Clause 10. The apparatus of clause 9, wherein a wingtip end of the first link is rotatably coupled to a support rib of the wingtip at a first link wingtip joint.

Clause 11. The apparatus of clause 10, wherein the first link wingtip joint is located at a center of gravity of the wingtip.

Clause 12. The apparatus of clause 1, further comprising a track affixed to the fixed wing and defining an elongated channel, wherein the first link comprises a roller at a fixed wing end that extends into the elongated channel to guide movement of the wingtip between the extended position and the stowed position.

Clause 13. The apparatus of clause 12, further comprising a latch assembly affixed to a trailing end of the track, the latch assembly configured to releasably capture a latch stay affixed to the second link to lock the wingtip in the extended position.

Clause 14. The apparatus of clause 12, wherein a fixed wing end of the second link is rotatably coupled to a fixed wing spar of the fixed wing at a second link fixed wing joint.

Clause 15. The apparatus of clause 14, wherein a wingtip end of the second link is rotatably coupled to a support rib of the wingtip at a second link wingtip joint.

Clause 16. The apparatus of clause 15, wherein the second link wingtip joint is located at a center of gravity of the wingtip.

Clause 17. The apparatus of clause 12, wherein the second link comprises an actuator piston joint, and the piston of the actuator is rotatably coupled to the piston actuator joint.

Clause 18. The apparatus of clause 12, wherein the actuator is rotatably coupled to the fixed wing at an actuator joint.

Clause 19. An aircraft, comprising: a fixed wing extending from a fuselage; a wingtip moveably coupled to an outboard end of the fixed wing; and an apparatus for moving the wingtip at least partially behind the fixed wing, the apparatus comprising: a first link extending from a wingtip of the aircraft and moveably coupled to a fixed wing of the aircraft; a second link extending from the wingtip and moveably coupled to the fixed wing; and an actuator coupled to the fixed wing and, the actuator comprising a piston coupled to the second link; wherein the actuator is configured to extend the piston to move the second link and cause the wingtip to move between an extended position and a stowed position.

Clause 20. A method of shortening a wingspan of an aircraft, the method comprising: providing an apparatus for moving a wingtip at least partially behind a fixed wing of the aircraft, the apparatus comprising: a first link extending from a wingtip of the aircraft and moveably coupled to a fixed wing of the aircraft; a second link extending from the wingtip and moveably coupled to the fixed wing; and an actuator coupled to the fixed wing and, the actuator comprising a piston coupled to the second link; positioning the wingtip at an outboard end of the fixed wing; and extending the piston actuator to move the second link and cause the wingtip to move at least partially behind the fixed wing.

The invention claimed is:

1. An apparatus for shortening a wingspan of an aircraft, the apparatus comprising:
    a first link extending from a wingtip of the aircraft and moveably coupled to a fixed wing of the aircraft;
    a second link extending from the wingtip and moveably coupled to the fixed wing; and
    an actuator coupled to the fixed wing and to the second link, the actuator comprising a piston;
    wherein the actuator is configured to extend the piston to move the second link and cause the wingtip to move between an extended position in which the wingtip is substantially coplanar with the fixed wing and a stowed position in which the wingtip is substantially coplanar with the fixed wing.

2. The apparatus of claim 1, further comprising a third link comprising an actuator end rotatably coupled to the actuator and a mounting end rotatably coupled to the fixed wing.

3. The apparatus of claim 2, wherein the second link comprises a first connecting member and a second connecting member.

4. The apparatus of claim 3, wherein the first connecting member comprises a latch extension that defines a latch aperture, and the apparatus further comprises a latch actuator affixed to a fixed wing front spar of the fixed wing, the latch actuator configured to extend a latch pin through the latch aperture of the latch extension to lock the wingtip in the extended position.

5. The apparatus of claim 3, wherein the first connecting member and the second connecting member are rotatably coupled to the fixed wing at a second link joint.

6. The apparatus of claim 5, wherein the second link joint is coupled to an actuator joint, and the actuator is rotatably coupled to the actuator joint.

7. The apparatus of claim 6, wherein the actuator is rotatably coupled to the fixed wing at the actuator joint.

8. The apparatus of claim 1, wherein a fixed wing end of the first link is rotatably coupled to a fixed wing rear spar of the fixed wing at a first link fixed wing joint.

9. The apparatus of claim 8, wherein a wingtip end of the first link is rotatably coupled to a support rib of the wingtip at a first link wingtip joint.

10. The apparatus of claim 9, wherein the first link wingtip joint is located at a center of gravity of the wingtip.

11. The apparatus of claim 1, further comprising a track affixed to the fixed wing and defining an elongated channel, wherein the first link comprises a roller at a fixed wing end that extends into the elongated channel to guide movement of the wingtip between the extended position and the stowed position.

12. The apparatus of claim 11, further comprising a latch assembly affixed to a trailing end of the track, the latch assembly configured to releasably capture a latch stay affixed to the second link to lock the wingtip in the extended position.

13. The apparatus of claim 11, wherein a fixed wing end of the second link is rotatably coupled to a fixed wing spar of the fixed wing at a second link fixed wing joint.

14. The apparatus of claim 13, wherein a wingtip end of the second link is rotatably coupled to a support rib of the wingtip at a second link wingtip joint.

15. The apparatus of claim 14, wherein the second link wingtip joint is located at a center of gravity of the wingtip.

16. The apparatus of claim 11, wherein the second link comprises a piston joint, and the actuator is rotatably coupled to the piston joint.

17. The apparatus of claim 11, wherein the actuator is rotatably coupled to the fixed wing at an actuator joint.

18. An aircraft, comprising:
a fixed wing extending from a fuselage;
a wingtip moveably coupled to an outboard end of the fixed wing; and
an apparatus for moving the wingtip at least partially behind the fixed wing, the apparatus comprising:
a first link extending from the wingtip of the aircraft and moveably coupled to the fixed wing of the aircraft;
a second link extending from the wingtip and moveably coupled to the fixed wing; and
an actuator coupled to the fixed wing and to the second link, the actuator comprising a piston;
wherein the actuator is configured to extend the piston to move the second link and cause the wingtip to move between an extended position in which the wingtip is substantially coplanar with the fixed wing and a stowed position in which the wingtip is substantially coplanar with the fixed wing.

19. A method of shortening a wingspan of an aircraft, the method comprising:
providing an apparatus for moving a wingtip at least partially behind a fixed wing of the aircraft, the apparatus comprising:
a first link extending from a wingtip of the aircraft and moveably coupled to a fixed wing of the aircraft;
a second link extending from the wingtip and moveably coupled to the fixed wing; and
an actuator coupled to the fixed wing and to the second link;
positioning the wingtip at an outboard end of the fixed wing; and
extending the actuator to move the second link and cause the wingtip to move from an extended position corresponding to a first wingspan of the aircraft in which the wingtip is substantially coplanar with the fixed wing to a stowed position corresponding to a second wingspan of the aircraft shorter than the first wingspan and in which the wingtip is substantially coplanar with the fixed wing.

20. The aircraft of claim 18, further comprising a track affixed to the fixed wing and defining an elongated channel, wherein the first link comprises a roller at a fixed wing end that extends into the elongated channel to guide movement of the wingtip between the extended position and the stowed position.

* * * * *